United States Patent
Alig

(10) Patent No.: US 11,261,772 B2
(45) Date of Patent: Mar. 1, 2022

(54) ASSEMBLY AND METHOD FOR DETERMINING LAMBDA VALUES

(71) Applicant: Bayerische Motoren Werke Aktiengesellschaft, Munich (DE)

(72) Inventor: Robert Alig, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/367,867

(22) Filed: Mar. 28, 2019

(65) Prior Publication Data

US 2019/0218951 A1 Jul. 18, 2019

Related U.S. Application Data

(63) Continuation of application No. PCT/EP2017/078625, filed on Nov. 8, 2017.

(30) Foreign Application Priority Data

Nov. 29, 2016 (DE) ..................... 10 2016 223 723.3

(51) Int. Cl.
*F01N 3/20* (2006.01)
*F01N 13/00* (2010.01)
(Continued)

(52) U.S. Cl.
CPC ......... *F01N 3/2073* (2013.01); *F01N 13/008* (2013.01); *F01N 13/0097* (2014.06);
(Continued)

(58) Field of Classification Search
CPC .... F01N 11/00; F01N 13/008; F01N 2550/02; F01N 2560/02; F01N 2560/026;
(Continued)

(56) References Cited

U.S. PATENT DOCUMENTS

| 5,241,853 A | 9/1993 | Tsuei et al. |
| 5,265,417 A | 11/1993 | Visser et al. |

(Continued)

FOREIGN PATENT DOCUMENTS

| CN | 105003329 A | 10/2015 |
| DE | 102 54 704 A1 | 6/2004 |

(Continued)

OTHER PUBLICATIONS

ETAS, https://www.etas.com/en/products/compact_lambda_measurement_modules-details.php (Year: 2010).*

(Continued)

*Primary Examiner* — Anthony Ayala Delgado
(74) *Attorney, Agent, or Firm* — Crowell & Moring LLP

(57) ABSTRACT

An assembly for determining lambda values of an exhaust gas of an internal combustion engine is provided. The internal combustion engine is attached to an exhaust gas treatment device with at least one first catalyst and a second catalyst. Additionally, the assembly has the following: a first lambda sensor in a first removal line, wherein the first removal line is designed to remove a part of the exhaust gas upon entering the first catalyst and conduct same back into the exhaust gas treatment device after the exhaust gas passes the first lambda sensor, and the first lambda sensor and at least one part of the first removal line are arranged outside of the exhaust gas treatment device; and a second lambda sensor in a second removal line, wherein the second removal line is designed to remove a part of the exhaust gas between the first catalyst and the second catalyst and conduct same back into the exhaust gas treatment device after the exhaust gas passes the second lambda sensor, and the second lambda sensor and at least one part of the second removal line are arranged outside of the exhaust gas treatment device.

17 Claims, 1 Drawing Sheet

(51) Int. Cl.
*G01N 1/22* (2006.01)
*F02D 41/14* (2006.01)

(52) U.S. Cl.
CPC ..... *F02D 41/1439* (2013.01); *F02D 41/1441* (2013.01); *F02D 41/1456* (2013.01); *G01N 1/2252* (2013.01); *F01N 2560/025* (2013.01); *F01N 2560/14* (2013.01)

(58) Field of Classification Search
CPC ............... F01N 11/007; F01N 2470/18; F01N 2560/025; F01N 2610/148; F01N 2900/0416; F01N 2900/1402; F01N 3/2066; F01N 3/208; Y02T 10/47; B01D 46/442; B01D 46/444; G01N 33/0009
See application file for complete search history.

(56) References Cited

U.S. PATENT DOCUMENTS

| | | | |
|---|---|---|---|
| 7,089,811 B2 * | 8/2006 | Allmendinger | F01N 13/008 73/23.31 |
| 2005/0160840 A1 | 7/2005 | Allmendinger | |
| 2007/0214862 A1 | 9/2007 | Kubinski et al. | |
| 2012/0180457 A1 * | 7/2012 | Liu | F01N 3/2066 60/276 |
| 2015/0039256 A1 * | 2/2015 | Michalske | F01N 9/00 702/104 |
| 2015/0122002 A1 | 5/2015 | Mackaldener | |
| 2018/0016958 A1 * | 1/2018 | Jung | B01J 38/00 |

FOREIGN PATENT DOCUMENTS

| | | |
|---|---|---|
| DE | 10 2007 012 056 A1 | 9/2007 |
| DE | 10 2007 038 516 A1 | 2/2009 |
| DE | 10 2014 119 504 A1 | 10/2015 |
| JP | 59-224438 A | 12/1984 |
| JP | 7-116469 A | 5/1995 |
| KR | 20-0469742 Y1 | 11/2013 |
| WO | WO 2012/001222 A1 | 1/2012 |
| WO | WO 2012/096675 A1 | 7/2012 |

OTHER PUBLICATIONS

International Search Report (PCT/ISA/210) issued in PCT Application No. PCT/EP2017/078625 dated Feb. 12, 2018 with English translation (six (6) pages).
German-language Written Opinion (PCT/ISA/237) issued in PCT Application No. PCT/EP2017/078625 dated Feb. 12, 2018 (six (6) pages).
German-language Search Report issued in counterpart German Application No. 102016223723.3 dated Jun. 20, 2017 with partial English translation (14 pages).
Chinese Office Action issued in Chinese application No. 201780060441.2 dated Feb. 3, 2021, with English translation (Fourteen (14) pages).

* cited by examiner

ASSEMBLY AND METHOD FOR DETERMINING LAMBDA VALUES

CROSS REFERENCE TO RELATED APPLICATIONS

This application is a continuation of PCT International Application No. PCT/EP2017/078625, filed Nov. 8, 2017, which claims priority under 35 U.S.C. § 119 from German Patent Application No. 10 2016 223 723.3, filed Nov. 29, 2016, the entire disclosures of which are herein expressly incorporated by reference.

BACKGROUND AND SUMMARY OF THE INVENTION

The invention relates to an assembly and to a method for determining lambda values, in particular, of an internal combustion engine for a motor vehicle.

In internal combustion engines, it is known to measure a (residual) oxygen content of an exhaust gas. In particular, measurement of a lambda value can provide information about whether combustion of fuel is complete or whether there is a lack of air or fuel. In known internal combustion engines, lambda sensors are used at various points of exhaust gas systems. In the case of known assemblies, a non-representative proportion of an exhaust gas is often used for the measurement in this case.

Proceeding from this, an object of the present invention is furthermore to solve or at least ameliorate the technical problems outlined in connection with the prior art. In particular, an assembly and a method with which lambda values can be measured in a particularly accurate manner are intended to be presented.

This and other objects are achieved by way of an assembly for determining lambda values in accordance with embodiments of the invention and by way of a method for determining lambda values in accordance with embodiments of the invention. Further advantageous refinements of the assembly are specified in various embodiments. The features mentioned individually in the patent claims can be combined with one another in any desired, technologically meaningful manner and can be supplemented with explanatory information from the description, wherein further variant embodiments of the invention are given.

The invention presents an assembly for determining lambda values of an exhaust gas of an internal combustion engine. The internal combustion engine is attached to an exhaust gas treatment apparatus including at least one first catalytic converter and one second catalytic converter. The assembly also includes:

a first lambda sensor in a first extraction line, wherein the first extraction line is designed to extract a portion of the exhaust gas as it enters the first catalytic converter and to return said portion of the exhaust gas to the exhaust gas treatment apparatus after it passes the first lambda sensor, wherein the first lambda sensor and at least a portion of the first extraction line are arranged outside the exhaust gas treatment apparatus, and a second lambda sensor in a second extraction line, wherein the second extraction line is designed to extract a portion of the exhaust gas between the first catalytic converter and the second catalytic converter and to return said portion of the exhaust gas to the exhaust gas treatment apparatus after it passes the second lambda sensor, wherein the second lambda sensor and at least a portion of the second extraction line are arranged outside the exhaust gas treatment apparatus.

The internal combustion engine is preferably an internal combustion engine for a motor vehicle. Fuel is preferably burnt with air in cylinders which form the combustion chambers of the internal combustion engine. Resulting exhaust gas can be given off to the surrounding area by the exhaust gas treatment apparatus via an exhaust gas line. The exhaust gas treatment apparatus includes at least the first catalytic converter and the second catalytic converter. The first catalytic converter and the second catalytic converter are preferably designed as monoliths.

A ratio of fuel to air can preferably be set for burning fuel in the combustion chambers of the internal combustion engine. The lambda value is a measure of this ratio. If the lambda value is equal to one, the fuel is completely burnt. This means that there is a stoichiometric mixture of fuel and oxygen (which is contained in the air). At a lambda value of below "1", there is an excess of fuel. This means that the fuel cannot be completely burnt. The fuel/air mixture can also be referred to as rich at a lambda value of below "1". At a lambda value of above "1", there is a lack of fuel. This means that a portion of the oxygen remains unused. The fuel/air mixture can also be referred to as lean at a lambda value of above "1".

Particularly on account of statutory regulations and/or for reasons of environmental protection, the internal combustion engine is preferably not operated at a lambda value which differs considerably from "1". This applies in particular to exhaust gas measurement within the scope of the so-called real driving emission (RDE). For example, pollutants cannot be optimally converted and therefore optimally decomposed in a catalytic converter at a lambda value which differs from "1". Therefore, it is preferred for the lambda value to be able to be regulated at "1" as efficiently as possible.

The lambda value is preferably ascertained by comparing a (residual) oxygen content in the exhaust gas of the internal combustion engine with an oxygen content of the ambient air. This can be performed in the lambda sensors. Partial streams of the exhaust gas are preferably routed across the lambda sensors. The partial streams are preferably guided via the extraction lines into which the lambda sensors are integrated. In this case, preference is given to the partial stream which is routed across a lambda sensor being representative of a total exhaust gas stream. This means, in particular, that a lambda value which can be ascertained with the partial stream corresponds to a lambda value of the total exhaust gas stream and therefore preferably to an actual lambda value of the exhaust gas (or the combustion). Preference is therefore given to the extraction lines being designed in such a way that a representative partial stream of the exhaust gas can be extracted from a total exhaust gas stream via the extraction lines. This can be achieved, in particular, by extraction openings of the extraction lines being provided at points of the catalytic converters at which the exhaust gas has a representative lambda value. These points can be ascertained, for example, experimentally and/or by way of a simulation. There is generally not a representative lambda value in particular in an edge region of a catalytic converter. In particular, preference is therefore given to the exhaust gas not being extracted at the edge of a catalytic converter through an opening but rather at a point in the interior of the catalytic converter. The extraction openings are preferably arranged on a side of the extraction line toward which exhaust gas flows. This means that an exhaust gas stream in the exhaust gas treatment apparatus is preferably directed toward the extraction openings.

Two lambda values can be measured using the described assembly (a first lambda value using the first lambda sensor and a second lambda value using the second lambda sensor). The first lambda value, which is measured upstream of the first catalytic converter, can allow, in particular, regulation of the fuel/air mixture, in the case of which regulation it is possible to quickly react to a change. This can be due, in particular, to the first lambda sensor being arranged close to the combustion chambers of the internal combustion engine. Therefore, a change in the fuel/air ratio which is actually present during the combustion can quickly lead to a change in the measured first lambda value. However, the first lambda sensor can be exposed to particularly high exhaust gas temperatures and untreated exhaust gas. This can (permanently or briefly) shift a characteristic curve of the first lambda sensor. A shift in the characteristic curve of this kind can be reduced by arranging the first lambda sensor within the first extraction line because the first lambda sensor is not directly exposed to the (total) exhaust gas stream. The second lambda sensor can be exposed to lower loads by the exhaust gas in comparison to the first lambda sensor. Therefore, a shift in the characteristic curve can be lower in the case of the second lambda sensor than in the case of the first lambda sensor, so that the second lambda value can be more accurate than the first lambda value. However, the second lambda sensor is further away from the combustion chambers of the internal combustion engine than the first lambda sensor. Therefore, regulation of the fuel/air mixture solely by means of the second lambda sensor could be too slow. Therefore, preference is given to using the second lambda sensor for correcting a shift in the characteristic curve of the first lambda sensor. The first lambda value is preferably used for regulating the fuel/air mixture, wherein a deviation between the first lambda value and the second lambda value is used to compensate for a shift in the characteristic curve of the first lambda sensor.

The treatment of exhaust gas in a catalytic converter can be inconsistent over a cross-sectional area of the catalytic converter. In particular, temperature differences between different regions of the catalytic converter and/or (inconsistent) aging phenomena of the catalytic converter can contribute to this. If a lambda value is measured in an inconsistent exhaust gas stream, a deviation from an actual lambda value (that is to say from a fuel/air ratio which is actually present during the combustion) can be particularly large. Therefore, preference is given to exhaust gas, after exiting the first catalytic converter, initially passing through a mixing zone before the second lambda value is measured as said exhaust gas enters the second catalytic converter. On account of the fact that the second lambda sensor is arranged in the second extraction line, the mixing zone can be embodied to be particularly short. Complete mixing of the exhaust gas emerging from the first catalytic converter is not necessary. It can suffice for a representative exhaust gas stream to be able to be extracted between the first catalytic converter and the second catalytic converter.

Arranging the lambda sensors in the extraction lines can render possible improved protection of the lambda sensors against damage due to water shock. Water shock is damage to a lambda sensor by water contained in the exhaust gas. Drops of water can form in exhaust gas pipes particularly immediately after the internal combustion engine is started. Water can be formed, in particular, by steam which is contained in the exhaust gas as combustion product condensing on cold walls of exhaust gas lines. Water is preferably prevented from reaching the lambda sensors. This is due, in particular, to the lambda sensors preferably being heated for operation. If a drop of water meets a heated lambda sensor, a temperature difference between the water and a surface of the lambda sensor can cause damage (in particular irreparable damage) to the lambda sensor. In order to prevent damage due to water shock, the lambda sensors are preferably first heated when the internal combustion engine and in particular the exhaust gas lines are sufficiently heated that water can no longer be produced due to condensation. With the described assembly, heating of the lambda sensors can be performed as early as particularly shortly after the internal combustion engine is started. The lambda sensors being integrated in the extraction lines can make a particular contribution to this. Particularly when the extraction lines have a smaller cross section than, for example, the catalytic converters, the extraction lines can be free of water particularly quickly after the internal combustion engine is started (in particular before the catalytic converters are free of water). Therefore, the lambda sensors can be set in operation particularly quickly after the internal combustion engine is started. Therefore, regulation of the fuel/air mixture can be performed as early as shortly after the internal combustion engine is started.

Furthermore, arranging the lambda sensors in the extraction lines can mean that the lambda sensors are exposed to colder exhaust gas than would be the case if the lambda sensors were arranged directly on or in a catalytic converter. Owing to a lower exhaust gas temperature, the lambda sensors can remain in use for a particularly long period of time because, in particular, high exhaust gas temperatures can cause aging phenomena of the lambda sensors.

Using the described assembly, extraction of the exhaust gas can be performed physically separately from the respective lambda sensor. Therefore, the lambda sensors can be arranged in a particularly flexible manner, as a result of which construction of a motor vehicle can be made easier. The lambda sensors do not have to be arranged directly on the exhaust gas treatment apparatus.

In a preferred embodiment of the assembly, at least one of the extraction lines extends at least partially into the exhaust gas treatment apparatus.

With preference, both extraction lines extend at least partially into the exhaust gas treatment apparatus. In particular, preference is given to the first extraction line having an extraction opening in the exhaust gas treatment apparatus at a point in front of the first catalytic converter. Furthermore, preference is given to the second extraction line having an extraction opening in the exhaust gas treatment apparatus at a point between the first catalytic converter and the second catalytic converter. The extraction openings are preferably arranged in a center of an exhaust gas stream in the exhaust gas treatment apparatus. If the exhaust gas treatment apparatus is embodied in a rotationally symmetrical manner, the center of the exhaust gas stream can be present, for example, in an axis of the exhaust gas treatment apparatus.

A representative partial stream of the exhaust gas for measuring the lambda value can be provided particularly when the exhaust gas is extracted at a point in the interior of the exhaust gas treatment apparatus (that is to say in particular at a distance from an edge of the exhaust gas treatment apparatus) and in particular in the center of the exhaust gas stream.

In a further preferred embodiment of the assembly, the first lambda sensor is embodied as a wideband sensor and the second lambda sensor is embodied as a discrete-level sensor.

The discrete-level sensor is preferably designed to measure lambda values in particular in the region of one. The discrete-level sensor can specify, in particular particularly accurately, whether the lambda value is greater than or less than one. The wideband sensor is preferably designed to measure lambda values over a larger value range than the discrete-level sensor with the same degree of accuracy. Regulation of the internal combustion engine can preferably be performed using the wideband sensor.

In a further preferred embodiment of the assembly, a plurality of extraction openings are provided on at least one of the extraction lines.

A representative partial stream of the exhaust gas flowing through the exhaust gas treatment apparatus for measuring the lambda value can be provided particularly when exhaust gas is extracted through a plurality of extraction openings in an extraction line.

In a further embodiment, the assembly further has at least one closure apparatus for closing at least one of the extraction openings.

Preference is given to the different extraction openings being embodied in a switchable manner. This means that the individual extraction openings can preferably be individually opened or closed in each case. Therefore, changes in flow can be taken into account by different operating points of the internal combustion engine and/or by different settings, for example, of flow flaps and/or valves (such as, for example, of a wastegate) within the internal combustion engine. Switching (that is to say opening and closing) of the extraction openings is preferably performed in such a way that a representative partial stream of the exhaust gas for the respective measurement is taken at each operating point of the internal combustion engine.

The closure apparatus preferably includes at least one valve. One or more of the extraction openings can be closed using a single closure apparatus. For example, an entire extraction line can be blocked using a single closure apparatus, so that all extraction openings upstream of the closure apparatus can be regarded as being closed.

In a further preferred embodiment of the assembly, at least one of the extraction lines has a plurality of line branches.

The line branches are preferably arranged on an extraction side of the extraction line, so that exhaust gas can be extracted at a plurality of extraction points via the plurality of line branches of an extraction line. Preference is given to each line branch having at least one extraction opening. The exhaust gas extracted via the plurality of line branches is preferably combined in the respective extraction line before passing the lambda sensor. In this embodiment, the extraction of exhaust gas can be performed at different extraction points using one extraction line. In particular, a representative partial stream of the exhaust gas flowing through the exhaust gas treatment apparatus can be provided for measuring the lambda value as a result.

An entire line branch can also be closed by the closure apparatus, as a result of which all extraction openings of the corresponding line branch can be regarded as being closed.

In a further preferred embodiment of the assembly, the first extraction line is designed to return the exhaust gas to the first catalytic converter.

The first extraction line is preferably designed to return the exhaust gas to the first catalytic converter (which is part of the exhaust gas treatment apparatus) after it passes the first lambda sensor, that is to say after determining the first lambda value. Owing to the exhaust gas being returned to the first catalytic converter, the exhaust gas flowing via the first extraction line can also be at least partially treated in the first catalytic converter (and additionally in the second catalytic converter).

In a further preferred embodiment, the assembly further includes a third lambda sensor in a third extraction line, wherein the third extraction line is designed to extract a portion of the exhaust gas as it exits from the second catalytic converter and to return said portion of the exhaust gas to an exhaust gas line after it passes the third lambda sensor downstream of the exhaust gas treatment apparatus, wherein the third lambda sensor and at least a portion of the third extraction line are arranged outside the exhaust gas treatment apparatus.

A third lambda value can preferably be recorded using the third lambda sensor. The third lambda value can be used, for example (depending on the operating situation of the internal combustion engine), instead of the second lambda value or in combination with the second lambda value for correcting a shift in the characteristic curve of the first lambda sensor. For example, the plausibility of the second lambda value can be checked by the third lambda sensor. The third lambda value can be used instead of the second lambda value particularly in the event of an obvious malfunction in the second lambda sensor. A shift in the characteristic curve of the second lambda sensor can also be identified and possibly corrected using the third lambda sensor.

In a further preferred embodiment of the assembly, at least one of the following sensors is integrated into at least one of the extraction lines:
   temperature sensor,
   pressure sensor,
   pollutant sensor, and/or
   particle sensor.

In this embodiment, further parameters which can contain information about the combustion in the combustion chambers of the internal combustion engine can be determined in addition to the lambda values. The pollutant sensor is preferably a gas detector which is sensitive to carbon monoxide, carbon dioxide, hydrocarbons and/or nitrogen oxides (in particular NO and/or $NO_2$). The particle sensor is preferably intended and designed to measure, in particular, a particle size, a particle composition and/or a particle quantity (that is to say a number of particles).

In particular in order that the exhaust gas flowing via the second extraction line can be at least partially treated in the second catalytic converter, preference is given to a further embodiment of the assembly in which the second extraction line is designed to return the exhaust gas to the second catalytic converter.

The invention is used, in particular, in a motor vehicle having at least:
   an internal combustion engine with an exhaust gas treatment apparatus including at least one first catalytic converter and one second catalytic converter connected to it, and
   an assembly for determining lambda values, which assembly is embodied as described.

The particular advantages and refinement features described further above for the assembly are applicable and transferable to the described motor vehicle.

A method for determining lambda values of an exhaust gas of an internal combustion engine is presented as a further aspect of the invention. The internal combustion engine is attached to an exhaust gas treatment apparatus comprising at least one first catalytic converter and one second catalytic converter. The method comprises at least the following method acts:

a) extracting a portion of the exhaust gas as it enters the first catalytic converter,
b) measuring a first lambda value from the exhaust gas which was extracted in act a),
c) returning the exhaust gas which was extracted in act a) to the exhaust gas treatment apparatus,
d) extracting a portion of the exhaust gas between the first catalytic converter and the second catalytic converter,
e) measuring a second lambda value from the exhaust gas which was extracted in act d), and
f) returning the exhaust gas which was extracted in act d) to the exhaust gas treatment apparatus.

The particular advantages and refinement features described further above for the assembly are applicable and transferable to the described method. In particular, preference is given to the method being carried out using the described assembly for determining lambda values.

The exhaust gas is preferably extracted via the first extraction line in act a). In act b), the measurement of the first lambda value is preferably performed by way of the first lambda sensor. In act c), the exhaust gas from the first extraction line is preferably returned to the exhaust gas treatment apparatus and in particular to the first catalytic converter.

The exhaust gas is preferably extracted via the second extraction line in act d). In act e), the measurement of the second lambda value is preferably performed by way of the second lambda sensor. In act f), the exhaust gas from the second extraction line is preferably returned to the exhaust gas treatment apparatus and in particular to the second catalytic converter.

The invention and the technical field will be explained in more detail below with reference to the figures. The figures show particularly preferred exemplary embodiments, however the invention is not limited to these. In particular, it should be noted that the figures and in particular the illustrated size ratios are merely schematic.

DETAILED DESCRIPTION OF THE DRAWINGS

Figure 1:
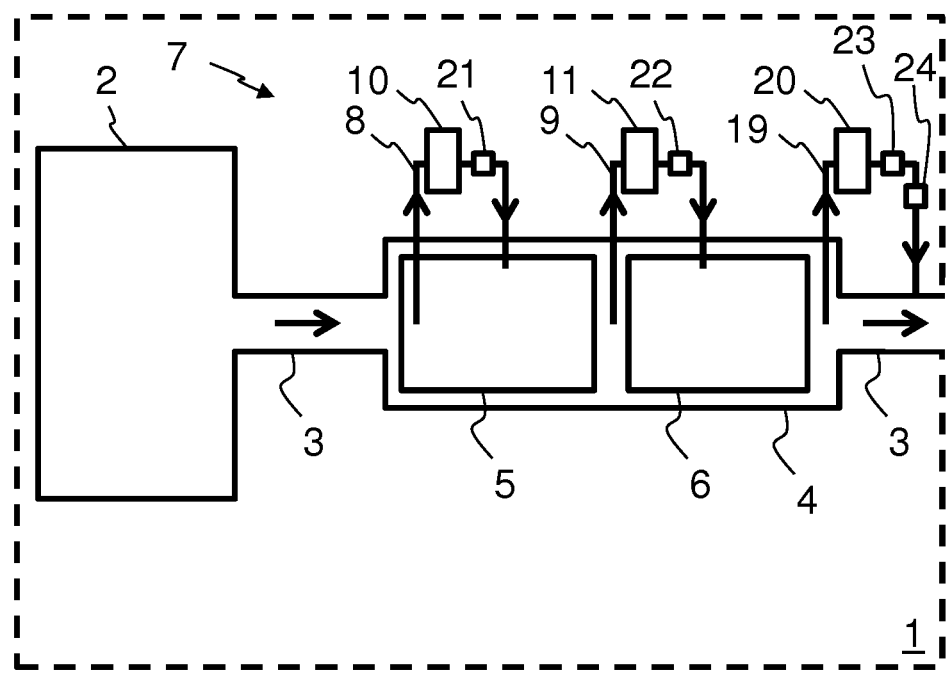
FIG. 1 is a schematic illustration of a motor vehicle having an assembly for determining lambda values.

FIG. 1 shows a motor vehicle 1 having an internal combustion engine 2. An exhaust gas treatment apparatus 4 including at least one first catalytic converter 5 and at least one second catalytic converter 6 is connected to the internal combustion engine 2 via an exhaust gas line 3. A direction of flow of the exhaust gas is indicated by arrows. The motor vehicle 1 further has an assembly 7 for determining lambda values. The assembly 7 includes a first lambda sensor 10 in a first extraction line 8. The first lambda sensor 10 is embodied as a wideband sensor. The first extraction line 8 is designed to extract a portion of the exhaust gas as it enters the first catalytic converter 5 and to return said portion of the exhaust gas to the first catalytic converter 5 (which is part of the exhaust gas treatment apparatus 4) after it passes the first lambda sensor 10. The first lambda sensor 10 and a portion of the first extraction line 8 are arranged outside the exhaust gas treatment apparatus 4. Furthermore, the assembly 7 includes a second lambda sensor 11 in a second extraction line 9. The second lambda sensor 11 is embodied as a discrete-level sensor. The second extraction line 9 is designed to extract a portion of the exhaust gas between the first catalytic converter 5 and the second catalytic converter 6 and to return said portion of the exhaust gas to the second catalytic converter 6 (which is part of the exhaust gas treatment apparatus 4) after it passes the second lambda sensor 11. The second lambda sensor 11 and a portion of the second extraction line 9 are arranged outside the exhaust gas treatment apparatus 4. The first extraction line 8 and the second extraction line 9 extend into the exhaust gas treatment apparatus 4.

The assembly 7 further includes a third lambda sensor 20 in a third extraction line 19. The third extraction line 19 is designed to extract a portion of the exhaust gas as it exits from the second catalytic converter 6 and to return said portion of the exhaust gas to the exhaust gas line 3 after it passes the third lambda sensor 20 downstream of the exhaust gas treatment apparatus 4. The third lambda sensor 20 and at least a portion of the third extraction line 19 are arranged outside the exhaust gas treatment apparatus 4.

A temperature sensor 21 is integrated into the first extraction line 8. A pressure sensor 22 is integrated into the second extraction line 9. A pollutant sensor 23 and a particle sensor 24 are integrated into the third extraction line 19.

Figure 2:
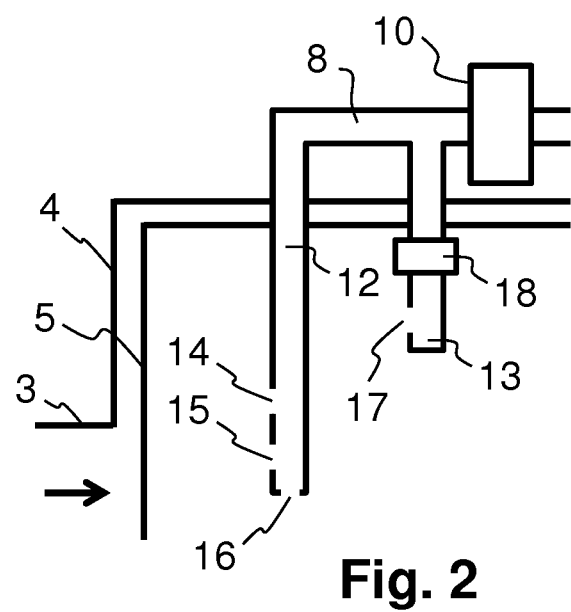
FIG. 2 is an enlarged schematic illustration of a portion of the assembly from FIG. 1.

FIG. 2 shows an enlarged schematic illustration of a portion of the assembly 7 from FIG. 1. A portion of the exhaust gas line 3, a portion of the exhaust gas treatment apparatus 4 with a portion of the first catalytic converter 5 and also a portion of the first extraction line 8 with the first lambda sensor 10 can be seen in said FIG. 2. The first extraction line 8 has a first line branch 12 and a second line branch 13. A first extraction opening 14, a second extraction opening 15 and a third extraction opening 16 are provided in the first line branch 12. The first extraction opening 14 and the second extraction opening 15 are arranged on a side of the extraction line toward which exhaust gas flows. The direction of flow of the exhaust gas is indicated by an arrow. A fourth extraction opening 17 is provided in the second line branch 13. Furthermore, the assembly 7 has a closure apparatus 18 for closing the fourth extraction opening 17.

LIST OF REFERENCE SYMBOLS

1 Motor vehicle
2 Internal combustion engine
3 Exhaust gas line
4 Exhaust gas treatment apparatus
5 First catalytic converter
6 Second catalytic converter
7 Assembly
8 First extraction line
9 Second extraction line
10 First lambda sensor
11 Second lambda sensor
12 First line branch
13 Second line branch
14 First extraction opening
15 Second extraction opening
16 Third extraction opening
17 Fourth extraction opening
18 Closure apparatus
19 Third extraction line
20 Third lambda sensor
21 Temperature sensor
22 Pressure sensor 23 Pollutant sensor
24 Particle sensor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An assembly for determining lambda values of an exhaust gas of an internal combustion engine, wherein the internal combustion engine is attached to an exhaust gas treatment apparatus including at least one first catalytic converter and at least one second catalytic converter, the assembly comprising:
   a first lambda sensor in a first extraction line, wherein the first extraction line is designed to extract a portion of the exhaust gas at a point in an interior of the first catalytic converter at a distance from an edge of the first catalytic converter and to return the portion of the exhaust gas to the first catalytic converter after it passes the first lambda sensor, where the first lambda sensor and at least a portion of the first extraction line are arranged outside the exhaust gas treatment apparatus; and
   a second lambda sensor in a second extraction line, wherein the second extraction line is designed to extract a portion of the exhaust gas at a center of a stream of the exhaust gas between the first catalytic converter and the second catalytic converter and to return the portion of the exhaust gas to the second catalytic converter after it passes the second lambda sensor, where the second lambda sensor and at least a portion of the second extraction line are arranged outside the exhaust gas treatment apparatus.

2. The assembly according to claim 1, wherein at least one of the first and second extraction lines extends at least partially into the exhaust gas treatment apparatus.

3. The assembly according to claim 2, wherein at least one of the first and second extraction lines has a plurality of line branches.

4. The assembly according to claim 1, wherein a plurality of extraction openings are provided on at least one of the first and second extraction lines.

5. The assembly according to claim 4, further comprising:
   at least one closure apparatus for closing at least one of the plurality of extraction openings.

6. The assembly according to claim 4, wherein at least one of the first and second extraction lines has a plurality of line branches.

7. The assembly according to claim 6, further comprising:
   a third lambda sensor in a third extraction line, wherein the third extraction line is designed to extract a portion of the exhaust gas as it exits from the second catalytic converter and to return the portion of the exhaust gas to an exhaust gas line after it passes the third lambda sensor downstream of the exhaust gas treatment apparatus, and
   the third lambda sensor and at least a portion of the third extraction line are arranged outside the exhaust gas treatment apparatus.

8. The assembly according to claim 7, wherein at least one of the following sensors is integrated into at least one of the first, second, and third extraction lines:
   temperature sensor,
   pressure sensor,
   pollutant sensor, or
   particle sensor.

9. The assembly according to claim 1, wherein at least one of the first and second extraction lines has a plurality of line branches.

10. The assembly according to claim 1, further comprising:
    a third lambda sensor in a third extraction line, wherein the third extraction line is designed to extract a portion of the exhaust gas as it exits from the second catalytic converter and to return the portion of the exhaust gas to an exhaust gas line after it passes the third lambda sensor downstream of the exhaust gas treatment apparatus, and
    the third lambda sensor and at least a portion of the third extraction line are arranged outside the exhaust gas treatment apparatus.

11. The assembly according to claim 1, wherein at least one of the following sensors is integrated into at least one of the first and second extraction lines:
    temperature sensor,
    pressure sensor,
    pollutant sensor, or
    particle sensor.

12. A motor vehicle comprising:
    an internal combustion engine with an exhaust gas treatment apparatus comprising at least one first catalytic converter and at least one second catalytic converter connected thereto, and
    an assembly for determining lambda values according to claim 1.

13. The assembly according to claim 1, wherein the assembly uses a first lambda value from the first lambda sensor for regulating a fuel/air mixture of the internal combustion engine and uses a deviation between the first lambda value from the first lambda sensor and a second lambda value from the second lambda sensor to compensate for a shift in a characteristic curve of the first lambda sensor.

14. The assembly according to claim 1, wherein the first lambda sensor is embodied as a wideband sensor and the second lambda sensor is embodied as a discrete-level sensor.

15. A method for determining lambda values of an exhaust gas of an internal combustion engine, wherein the internal combustion engine is attached to an exhaust gas treatment apparatus comprising at least one first catalytic converter and at least one second catalytic converter, the method comprising the acts of:
    a) extracting a portion of the exhaust gas at a point in an interior of the first catalytic converter at a distance from an edge of the first catalytic converter;
    b) measuring a first lambda value by a first lambda sensor from the exhaust gas which was extracted in act a);
    c) returning the exhaust gas which was extracted in act a) to the first catalytic converter;
    d) extracting a portion of the exhaust gas at a center of a stream of the exhaust gas between the first catalytic converter and the second catalytic converter;
    e) measuring a second lambda value by a second lambda sensor from the exhaust gas which was extracted in act d); and
    f) returning the exhaust gas which was extracted in act d) to the second catalytic converter.

16. The method according to claim 15 further comprising the acts of:
    g) using the first lambda value from the first lambda sensor to regulate a fuel/air mixture of the internal combustion engine; and h) using a deviation between the first lambda value from the first lambda sensor and the second lambda value from the second lambda sensor to compensate for a shift in a characteristic curve of the first lambda sensor.

17. The method according to claim 15, wherein the first lambda sensor is embodied as a wideband sensor and the second lambda sensor is embodied as a discrete-level sensor.

* * * * *